Feb. 20, 1968 TATSUO NAGASHIMA ETAL 3,369,813
APPARATUS FOR RECORDING AND REPRODUCING SOUNDS
ON MAGNETIC SHEETS
Filed Oct. 18, 1965
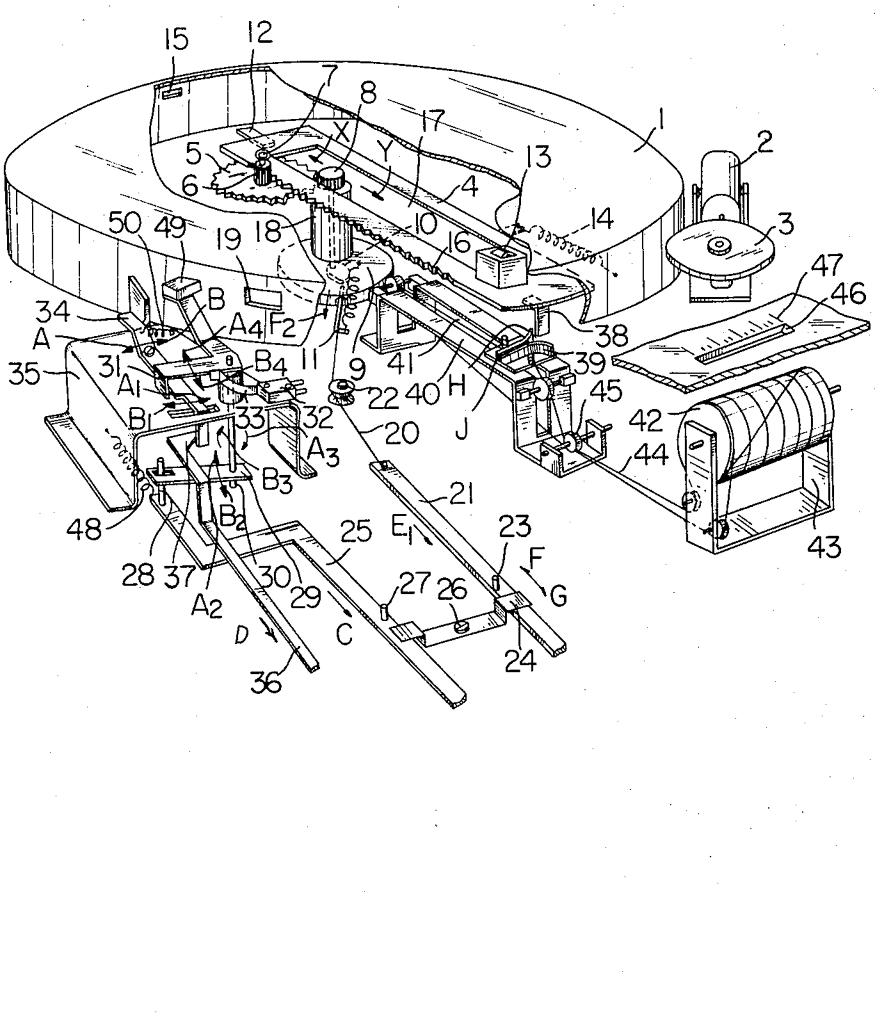

United States Patent Office 3,369,813
Patented Feb. 20, 1968

3,369,813

APPARATUS FOR RECORDING AND REPRODUCING SOUNDS ON MAGNETIC SHEETS

Tatsuo Nagashima and Fujio Suganuma, Tokyo, Japan, assignors to TDK Electronics Company, Limited, and Toyo Music Broadcasting Company, Limited, both of Tokyo, Japan, corporations of Japan Filed Oct. 18, 1965, Ser. No. 496,874
Claims priority, application Japan, Aug. 2, 1965, 40/46,907; Aug. 6, 1965, 40/47,815
3 Claims. (Cl. 274—4)

ABSTRACT OF THE DISCLOSURE

A transverse magnetic sheet recorder having a translating rack carrying a magnetic head and a gear eccentrically mounted on the turntable which drives the rack in response to turntable rotation. Provision is made for both automatic and manual stopping of the turntable so that the head shall always stop in a predetermined fixed position. An indicator is synchronized with the position of the head.

This invention relates to apparatus for recording and reproducing sounds on magnetic sheets.

Any conventional magnetic sound recording and reproducing apparatus of this kind is provided with a guide disk or a cam of a special contour operatively connected to and rotated with a turntable on which is set a magnetic sheet and also a feeding screw shaft to rotate as operatively connected with the turntable or a drum so that an arm having a sound recording and reproducing head may be guided to the turntable by their operations in recording and reproducing sounds. However, such conventional apparatus has the following defects:

(a) The mechanism is complicated and large;

(b) The mechanism is so complicated that tracking errors will be apt to occur in reproduction;

(c) The moving operation for the quick feed and quick return of the sound recording and reproducing head is difficult and specifically, in reproduction, the head will not perfectly synchronize and the head and indicator also will not synchronize with each other;

(d) It is difficult to operate the sound recording and reproducing head from any point on the magnetic sheet, that is to say, in case the magnetic head is to be moved to any position, the arm will have to be lifted and, in case the arm is to be set again, the guide groove in the guide disk will be apt to be broken and further the operation of the motor will have to be reversed or a cam will have to be operated and thus the operation is difficult; and (e) It is difficult to compensate scanning errors.

Further, various structures of indicators as additional devices to such magnetic sound recording and reproducing apparatus have been suggested. However, in any of them, as the rotary motion of the turntable is converted directly to an indicated amount, there will be caused such undesired actions that the amount of movement of the head and the indication of the indicator will not synchronize with each other and that, while the head is at a stop, the indicating device will be driven.

Further, as the turntable rotates only in one direction, in case the indicated amount is to be returned to zero, the indicator will have to be disengaged with the turntable. Thus the mechanism is more complicated.

The present invention is suggested to eliminate the above mentioned defects.

A principal object of the present invention is to provide an apparatus for recording and reproducing sounds on magnetic sheets wherein the movement and return of a head attached to a turntable can be quickly controlled with a mechanism provided outside the turntable.

Another object of the present invention is to provide an apparatus for recording and reproducing sounds on magnetic sheets wherein the driving mechanism is simple, the size can be made small and the action is accurate.

A further object of the present invention is to provide an apparatus for recording and reproducing sounds on magnetic sheets wherein the moving velocity of the head can be easily varied by changing gears in the mechanism.

Another object of the present invention is to provide an apparatus for recording and reproducing sounds on magnetic sheets wherein either automatic or manual stop can be freely made so that the head may stop always in any fixed position.

A further object of the present invention is to provide an apparatus for recording and reproducing sounds on magnetic sheets wherein any undesired action can be prevented.

Another object of the present invention is to provide an apparatus for recording and reproducing sounds on magnetic sheet and equipped with an indicator wherein the position of the magnetic head and the indication of the indicator perfectly synchronize with each other and any undesired action is eliminated.

The accompanying drawing is a perspective view of an embodiment of the present invention.

The embodiment of the present invention shall now be explained with reference to the drawing. In the drawing, 1 is a turntable on which a magnetic sheet is to be mounted so that sounds may be recorded and reproduced, 2 is a motor for driving the turntable and 3 is an idler for speed reduction through which said turntable 1 is to be rotated by the motor 2 for driving the turntable. 4 is a rack for moving a head, contained in the turntable 1 and supported so as to be slidable in the directions indicated by the arrows X and Y. Rack teeth 16 are made on one side of said rack for moving the head. A window 17 is made in the center of the rack.

5 is a gear. 6 is a pinion fixed to said gear 5. They are rotatably fitted to the inside of the turntable 1 with a screw 7. 8 is a center pinion rotatably fitted to a base 9 through a shaft 18. 10 is a projection for stopping the center pinion and secured to the shaft 18. 11 is a center pinion stopping rod inserted in the base 9. The rotation of the shaft 18 is prevented by the engagement of the tip of the center pinion stopping rod 11 with the projection 10 for stopping the center pinion.

13 is a head for recording and reproducing sounds and fixed on the upper surface of the rack 4 for moving the head. 14 is a spring to pull the rack 4 for moving the head in the direction indicated by the arrow Y. 12 is a projection for automatic stopping and fixed to the forward end of the rack for moving the head. 15 is a cut made in the outside wall of the turntable to receive the projection 12 for automatic stopping.

Said rack 4 is so made that the head 13 for recording and reproducing sounds provided on its upper surface may freely move in the diametral direction (the direction indicated by the arrow X) from the outer peripheral part to the center part of the turntable 1.

19 is a receiving hole for regulating the stopping position. 20 is a connecting spring connecting the center pinion stopping rod 11 and a center pinion releasing slide member 21. 22 is a pulley. 23 is a misaction preventing projection provided on the center pinion releasing slide member 21. 24 is a misaction preventing lever extended at the respective ends to the center pinion releasing slide member 21 and a starting member 25. 26 is a fulcrum of said misaction preventing lever 24. 27 is a misaction preventing projection provided on the starting lever 25. The starting lever 25 is in contact at one end with the misaction preventing member 24 and is operatively connected at the other end with a member 29 for rotation through connecting rod 28. 30 is a rotary shaft of a hook 31 for stopping and connects the lever 29 for rotation and hook 31 for stopping. 32 is an opening and closing switch in which the contact point will be closed when an opening and closing operating piece 33 is pushed with the hook 31 for stopping. 34 is a kick plate for automatic stopping and is rotatably fitted on a chassis 35 of the mechanism. The hook 31 for stopping is to engage with a stepped part on the side of said kick plate 34 for automatic stopping. 36 is an automatic engaging member and is engaged in a triangular part made at the forward end with a bent part of the kick plate 34 for automatic stopping.

38 is a tongue piece provided in the end part of the rack 4. 39 is a pair of receiving plates for said tongue piece 38 which slide along a groove 41 made in a moving supporting stand. 42 is an indicating drum pivoted on a supporting stand 43. 44 is a transmitting spring connected at both ends to the receiving plates so as to rotate the indicating drum 42 in response to the amount of movement of the receiving plates 39 through a roller 45. 46 is a groove made in a frame. 47 is a graduation made on the periphery of the groove.

Said receiving plates 39 are formed of a pair of plates having between them a clearance sufficient for the tongue piece to pass through. The inside plate of said receiving plates is bent to the center side of the turntable so as to give the receiving plates such force as will push the receiving plates in a direction substantially at right angles to the peripheral direction.

In the drawing, the tongue piece 38 is positioned above the receiving plates (a pair of plates set in parallel with each other) for said tongue piece. But, at the time of the actual operation, the tongue piece 38 will be well in contact with the receiving plates 39.

The operation of the apparatus of the present invention shall now be explained. The rotation of the motor 2 for driving the turntable will be transmitted to the idler 3 for speed reduction and the speed of the rotation will be reduced. As the idler 3 for speed reduction is in contact with the outer peripheral part of the turntable 1, with the rotation of the idler 3, the turntable 1 will rotate at a fixed number of revolutions. On the other hand, when the center pinion stopping projection 10 provided below the shaft 18 connected directly with the center pinion 8 fixed to the base 9 comes into contact with the center pinion stopping rod 11, said center pinion will not be able to rotate. In such state, if the turntable 1 rotates, as the gear 5 rotatably fitted to the turnable 1 wih the screw 7 circularly moving around the center pinion 8 as a center is in mesh with the center pinion 8, said gear 5 will rotate around the screw 7 as a center and the pinion 6 fixed to the gear 5 will also rotate. As the pinion 6 is in mesh with the rack teeth 16 made in the edge part of the rack 4, with the rotation of the pinion 6, the rack 4 for moving the head will move so that the head 13 for recording and reproducing sounds may move from the outer peripheral part of the turntable 1 toward the center.

When the sound recording and reproducing head 13 reaches a fixed position in the center part of the turntable 1, the projection 12 for automatic stopping provided in the end part of the rack 4 opposite the head 13 will pass through the cut 15 in the turntable 1 and will project on the outer periphery of the turntable 1.

In such state, the turntable 1 will rotate, the projection 12 will move to the position of the kick plate 34 for automatic stopping, will come into contact with said kick plate 34 and will push it in the direction indicated by the arrow A. Thereby the other end of the kick plate 34 will move in the direction indicated by the arrow $A_1$. Thus the kick plate 34 will be disengaged from the hook 31 for stopping and said hook 31 will be free to rotate. As the hook 31 is connected to the lever 29 for rotation through the rotary shaft 30 and the member 29 for rotation is connected to the starting lever 25 through the connecting rod 28, the lever 29 for rotation will be subjected to a force rotating in the direction indicated by the arrow $A_2$ by the tension of the spring 48 for the manual member attached to one end of the starting lever 25 and the rotary shaft 30 will also rotate in the direction indicated by the arrow $A_3$. Therefore, the hook 31 for stopping connected and fixed to the rotary shaft 30 will rotate at the same time in the direction indicated by the arrow $A_4$. The tip of a low friction piece 49 provided at one end of the hook 31 for stopping will come into contact with the outer peripheral part of turntable 1. Therefore, when the turntable 1 further rotates, the projection 12 for automatic stopping passes through the position of the kick plate 34 for automatic stopping and the receiving hole 19 for regulating the stopping position comes to the position of the low friction piece 49, the low friction piece 49 will fit in said receiving hole 19, the hook 31 for stopping will further rotate in the direction indicated by the arrow $A_4$, therefore the force pushing the opening and closing switch operating piece 33 will be eliminated, the contact point of the opening and closing switch will be opened and the rotation of the turntable 1 will automatically stop in the fixed position.

Then, if the starting member 25 is moved in the direction indicated by the arrow C by any proper means, the lever 29 for rotation connected with the starting member 25 through the connecting rod 28 will move in the direction indicated by the arrow $B_2$, the low friction piece 49 will be disengaged from the receiving hole 19 for regulating the stopping position, the opening and closing switch operating piece 33 will be pushed by the hook 31 for stopping so as to close the contact point of the switch and the rotation of the turntable will begin. Further, as the hook 31 for stopping moves in the direction indicated by the arrow $B_4$, the kick plate 34 will be moved in the direction indicated by the arrow $B_1$ by the tension of the spring 50 for the automatic stopping kick plate and the hook 31 for stopping will be engaged with the kick plate 34 by the stepped part made in the kick plate 34. In such state, even if the force moving in the direction indicated by the arrow C is removed, the hook 31 for stopping will be fixed and held, the turntable 1 will rotate and sounds will be recorded or reproduced.

In such state, in case manual stopping is to occur before automatic stopping is effected with the projection 12 for automatic stopping, if the manual stopping member 36 is moved in the direction indicated by the arrow D, the kick plate 34 will be moved in the direction indicated by the arrow $A_1$ by the triangular part 37 at the other end of the manual stopping member 36 and the hook 31 for stopping will be disengaged from the kick plate 34 and will be free to rotate and then the turntable will stop in the fixed position as described above.

As described above, in the case of either automatic or manual stopping, when the turntable 1 stops, the sound recording and reproducing head 13 will stop as moved to the center part. Further, as the center pinion 8 is fixed with the center pinion fixing rod 11 and the turntable 1 is at a stop, the gear 5 and pinion 6 will not be able to rotate. Therefore, the rack 4 and head 13 will not be able to move. In such state, if the center pinion releasing slide member 21 is moved in the direction indicated by the arrow $E_1$, the rod 11 for fixing the center pinion will be also moved in the direction indicated by the arrow $F_2$ from the center part of the turntable 1 by the connecting spring 20 and the center pinion will be released from the fixed state and will be free to rotate.

Therefore, both gear 5 and pinion 6 will become free to rotate and the rack 4 and head 13 will be moved toward the outer periphery of the turntable by the tension of the return spring 14 and will return to the original state. Further, in case it is desired to set the head 13 in any desired position in advance, that is, in case it is desired to begin to record or reproduce sounds on the way, its object will be able to be attained by moving the center pinion releasing member 21 also in the direction indicated by the arrow $E_1$.

While sounds are being recorded or reproduced with the starting member 25 moved in the direction indicated by the arrow C, the lever 24 for preventing misactions will be rotated downward to a proper positon around the fulcrum 26 as a center and will come into contact at one end with the projection 23 for preventing misactions. In such state, as the kick plate 34 for automatic stopping is fixed and held by the engagement of the hook 31 for stopping, the projection 27 for preventing misactions will be also fixed and the lever 24 for preventing misactions will become unable to rotate in the direction indicated by the arrow G.

Therefore, during the rotation of turntable 1, the center pinion releasing member 21 will not be able to be moved in the direction indicated by the arrow $E_1$ and therefore the center pinion 5 will also remain fixed. Thus, such misaction that the head 13 will return to the original position during the rotation can be prevented.

When the turntable 1 rotates, the rack 4 and the sound recording and reproducing head 13 provided on the upper surface of the end part of said rack 4 will integrally move toward the center part of the turntable 1. In such case, the tongue piece 38 provided on the lower surface of the end part of the rack 4 will also move.

The moving supporting stand 40 is fixed and positioned in parallel with the rack 4 below the turntable 1. (The fixing stand is not shown in the drawing.)

Now, when the tongue piece 38 is rotated by the rotation of the turntable 1 and comes to the position where the moving supporting stand 40 is fixed and set, the tongue piece 38 as synchronized with the head 13 will have moved toward the center of the turntable 1 from the initial state and will be therefore in contact with the part H of the receiving plates 39.

However, as the part H is in contact diagonally with the tongue piece 38, if the tongue piece 38 further rotates while in contact with the part H of the receiving plates 39, a force to push the receiving plates 39 inward toward the center will be produced, the receiving plates 39 will move toward the center, the tongue piece 38 will pass through the clearance J of the receiving plates 39 and will separate from the contact with the receiving plates 39 with the rotation.

When the turntable 1 further rotates and the tongue piece 38 comes again to the position of the supporting stand 40, the tongue piece 38 which will have moved further inward will again come into contact with the receiving plates 39 as described above and will push the receiving plates 39 further inward.

Thus, while keeping the same relative position with the tongue piece 38, that is, the head 13 in the diametral direction of the turntable 1, the receiving plates 39 will move with the movement of the head 13. Thus, as the indicating drum 42 rotatably fitted to the supporting stand 43 is connected with the receiving plates 39 through the transmitting string 44, the drum 42 will rotate in response to the movement of the receiving plates 39 and will indicate the time or the amount of recording or reproducing sounds.

Though the case of using the indicating drum as an indicator is shown in the above mentioned embodiment, it is not always necessary to limit the indicator to such indicating drum.

As the present invention is formed as described above, it has effects that:

(a) The movement and return (fixing in the original state) of the head fitted to the rotating turntable can be controlled with a mechanism provided outside the turntable.

(b) The driving mechanism is so simple as to be able to be made very small. Its action is so accurate that no tracking error will be produced. It is also easy to replace the parts.

(c) The moving speed of the head can be easily varied by changing the diameters of the gear and center pinion.

(d) Either automatic or manual stopping can be easily made.

(e) In the case of either automatic or manual stopping the head will stop always in a fixed position.

(f) Either automatic or manual stopping can be made with the same mechanism.

(g) Any misaction can be prevented very simply.

(h) As the starting and stopping and the return of the head can be effected by moving the respective members in the same direction, the operating mechanisms of those will be very easy.

(i) As the rotating motion of the turntable is not converted directly to the indicated amount, that is to say, as the amount of movement of the head 13 is converted to the indicated amount in a position where the tongue piece 38 is fitted in contact with the receiving plates 39, only when the turntable rotates, the indicating device will be positively synchronized with the drive. Thus, such misaction that only the indicating device will be driven while the turntable is at a stop can be eliminated. Therefore, in case the indicated amount is to be returned to the zero amount, the indicated amount will be able to be returned to zero only by the returning force of the head 13.

(j) Even in a turntable which rotates only in one direction, in case the indicated amount is to be returned to zero, it will not be necessary to disengage the indicator from the turntable and therefore no other returning force (spring) will be required. Therefore, the operation as well as the mechanism is very simple and the apparatus can be made very small and light.

(k) The position of the head 13 and the indication of the indicator will perfectly synchronize with each other.

What is claimed is:

1. Apparatus for recording and reproducing sounds on magnetic sheets by moving a magnetic head in response to the rotation of a turntable, comprising:

a turntable rotatable with respect to said sheet;

means for rotating said turntable;

a gear eccentrically mounted on said turntable and rotatable about its own axis;

a pinion mounted on said gear for rotation therewith;

a rack mounted for rotation with said turntable and for translation with respect to said turntable, said rack being in mesh with said pinion;

resilient means for biasing said rack toward an initial position;

a head for recording and reproducing sound mounted on said rack;

a center pinion in mesh with said gear provided in the center of said turntable and rotatable independently of the rotation of said turntable; and a center pinion stopping rod movable between a first position to prevent rotation of said center pinion and a second position to release said center pinion for rotation, so that rotation of said turntable while the center pinion is prevented from rotation causes said rack and head to translate, and when said center pinion is released for rotation said rack and head are returned to the original positions by said resilient means.

2. The apparatus of claim 1, further comprising a peripheral skirt on said turntable having a cut and a receiving hole;

movable means for stopping said turntable, mounted adjacent said skirt, the same including a low friction portion movable into said hole and a hook position;

movable control means mounted adjacent said skirt and biased into engagement with said hook portion for preventing movement of said stopping means, said control means including a kick plate;

a projection on said rack movable through said cut upon predetermined rack translation and engageable with said kick plate for moving said control means out of engagement with said hook portion;

actuating means operatively connected to said stopping means for moving said low friction portion into and out of hole-engaging position;

said actuating means being normally in a first position wherein said control means engages said hook portion and being biased toward a second position wherein said low friction portion is moved into hole-engaging position;

manually movable means for moving said control means out of engagement with said hook portion thereby to provide for manual stopping of said turntable;

a center gear-releasing means for moving said center pinion stopping rod into its second position, said stopping rod being normally biased into its first position;

mis-action prevention means connected to said release means and said actuating means for preventing releasing movement of said releasing means when said actuating means is in its first position;

switch means mounted adjacent said stopping means for controlling operation of said means for rotating said turntable; and means on said stopping means for contacting said switch means when said low friction portion is moved out of engaging position.

3. The apparatus of claim 1, further comprising a tongue-piece mounted on said rack for movement therewith;

a pair of receiving plates mounted for translation responsive to movement of said tongue-piece;

said plates having a clearance between them through which said tongue-piece can pass when rotated with said turntable;

means for converting movement of said tongue-piece to translation of said plate;

said means for converting comprising a bent portion on said plates for engaging said tongue-piece; an indicator; and means for transmitting motion of said plates to said indicator.

No references cited.

LEONARD FORMAN, *Primary Examiner.*

JOEL M. FREED, *Assistant Examiner.*